Apr. 3, 1923.

W. B. WESCOTT

CINEMATOGRAPHIC FILM FEEDING MECHANISM

Original Filed Sept. 11, 1916   2 sheets-sheet 1

1,450,343

Inventor:
William B. Wescott
by Roberts, Roberts & Cushman
Attys.

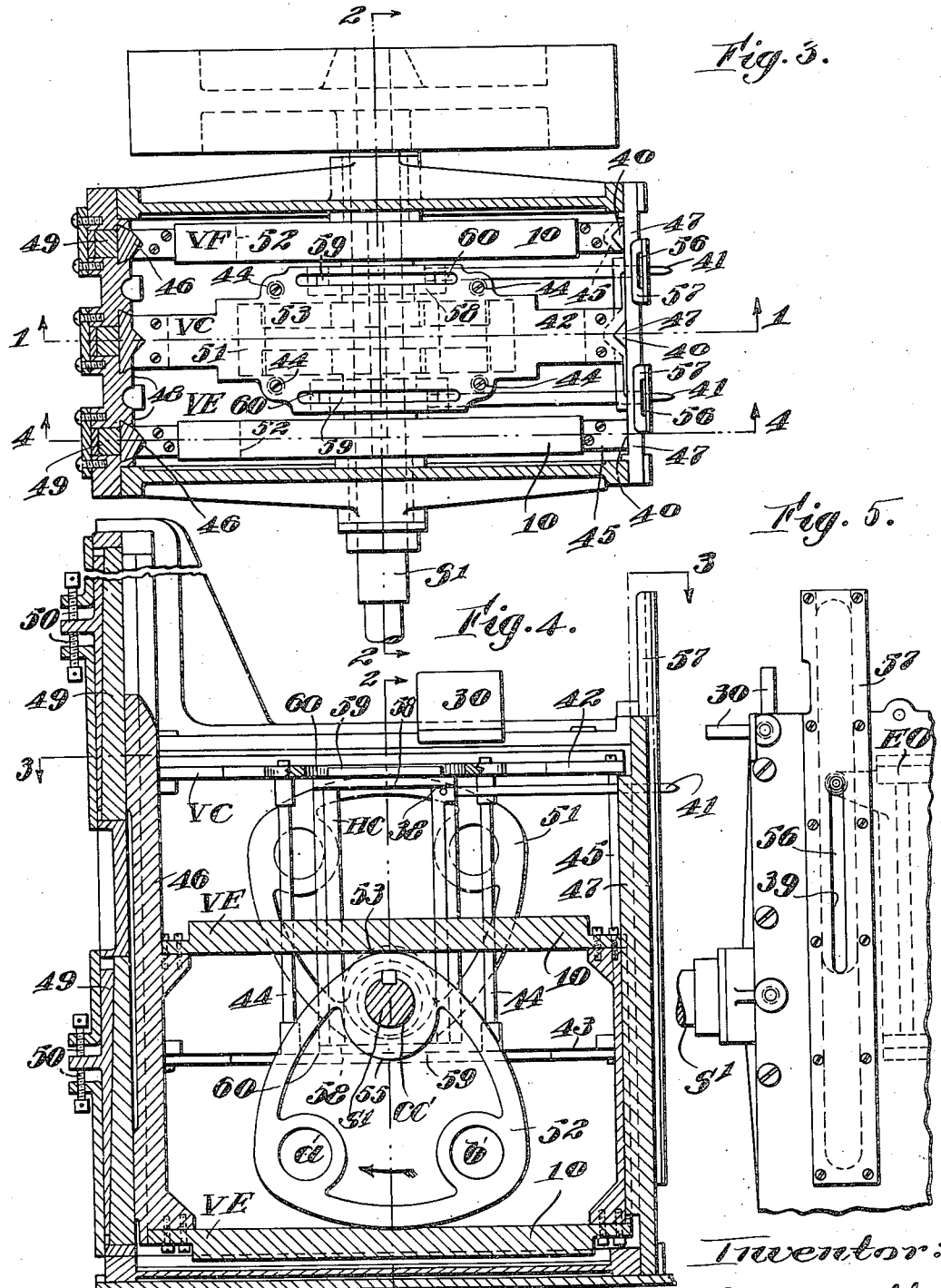

Patented Apr. 3, 1923.

1,450,343

UNITED STATES PATENT OFFICE.

WILLIAM BURTON WESCOTT, OF WELLESLEY, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

CINEMATOGRAPHIC FILM-FEEDING MECHANISM.

Original application filed September 11, 1916, Serial No. 119,377. Divided and this application filed April 25, 1921. Serial No. 464,204.

*To all whom it may concern:*

Be it known that I, WILLIAM BURTON WESCOTT, citizen of the United States of America, and resident of Wellesley, in the county of Norfolk and State of Massachusetts, have invented new and useful Improvements in Cinematographic Film-Feeding Mechanism, of which the following is a specification.

This invention relates to motion picture apparatus, and more particularly to a motion picture camera of the intermittent feed type adapted to take a plurality of simultaneous pictures of the same scene from the same point of view, this being a division of my prior application Serial No. 119,377, filed September 11, 1916. The invention herein claimed comprises a film moving cam system effectively balanced both with respect to linear and angular momentum.

In motion picture cameras it is highly desirable that all rotating and reciprocating parts should be substantially perfectly counterbalanced so as to eliminate vibration due to the movement of the parts of the machine. To this end I have provided mechanism comprising a reciprocating member for intermittently advancing the film which is counterbalanced by reciprocating means having motion at all times opposite to that of the film moving member and comprising rotating means for actuating the reciprocating parts which is so designed as to eliminate any unbalanced centrifugal force due to the rotation thereof.

I have illustrated a preferred embodiment in the accompanying drawings, in which—

Figure 3 is a section taken on the line 3—3 of Fig. 4, showing the film feeding mechanism in plan;

Figure 4 is a vertical section of the film feeding mechanism taken on line 4—4 of Fig. 3; and Figure 5 is a front elevation of a portion of the film feeding mechanism.

Figure 1:
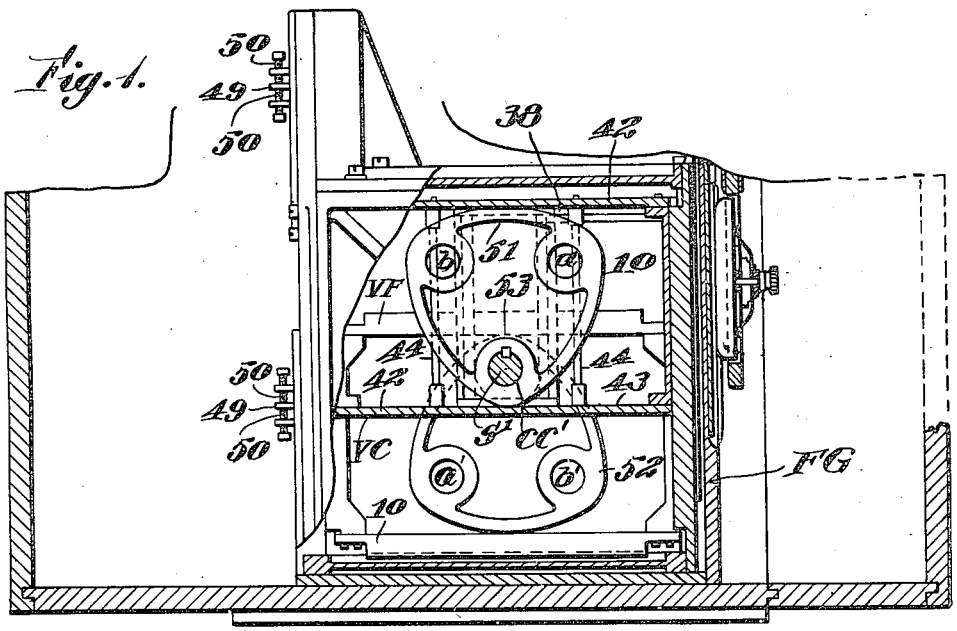
Figure 1 is a vertical longitudinal section through the center of a camera showing a section of the film feeding cam mechanism taken on the line 1—1 of Fig. 3.
Figure 2:
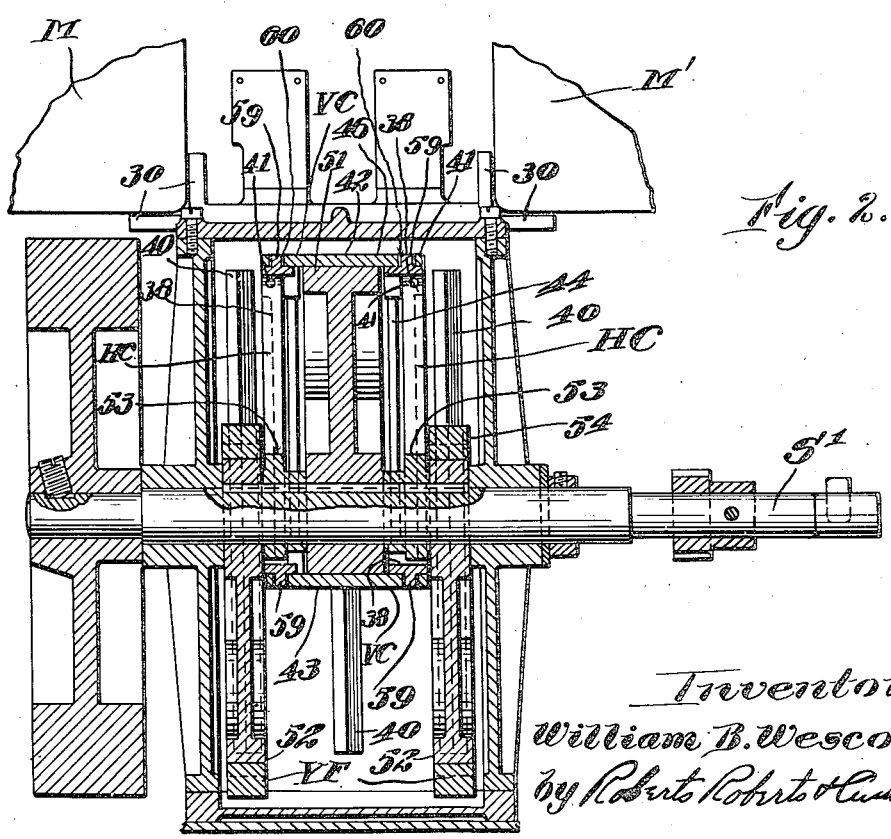
Figure 2 is a vertical section of the film feeding cam mechanism taken on line 2—2 of Fig. 3.

The particular form of my invention chosen for the purpose of illustration comprises a vertically reciprocating carriage VC; vertically reciprocating frames VF arranged on opposite sides of carriage VC to counterbalance the latter; cams 51 and 52 to actuate the respective vertically reciprocating members, the cams being angularly disposed about the axis thereof in such a manner as to counterbalance the centrifugal forces of each other; two horizontally reciprocating carriages HC mounted on carriage VC; film engaging pins 41 carried by the carriage HC; and cams 53 to actuate the carriage HC. Each of the horizontally reciprocating carriages HC comprises upper and lower horizontal members 38 connected together by spacing member 58 and having tongues 59 fitting into slots 60 in the carriage VC. The slots 60 are enough longer than the tongues to permit the carriage HC to be reciprocated a sufficient distance to advance and to withdraw the pins 41 through the film gate FG. The vertically reciprocating carriage VC comprises upper and lower cross members 42 and 43, connected together and accurately spaced apart by four rods 44, and front and back runners 45 and 46 respectively sliding in front and back guides 47 and 48. Each of the vertically reciprocating frames VF comprises upper and lower cross members 10 and front and back runners 45 and 46 cooperating with the front and back guides 47 and 48.

The front runner of each of the vertically reciprocating members preferably comprises a V-shaped groove fitting over a wedge-shaped ridge 40 on the reciprocating guide 47. The rear runner 46 of each of the vertically reciprocating members preferably comprises one or more longitudinal flanges fitting into a correspondingly shaped groove in the rear guide 48, thus affording bearing surface on the inside as well as on the outside of the runner. For the purposes hereinafter mentioned either the front or the rear runners and guides should be extended beyond the limit of movement of the reciprocating members, the rear sets being so shown in the drawings, and both the front and the rear sets may be thus extended if desired. The rear guides may be made adjustable by means of wedges 49 cooperating with inclined faces on the guides to aline and to vary the distance between the front and rear guides. The wedges may be provided with projections cooperating with opposed screws 50 mounted on projections on the film feed casing FF, whereby the wedges may be moved to adjust the guides.

The vertically reciprocating carriage VC and frames VF are actuated by cams 51 and 52 which bear on the interior faces of the upper and lower cross-member of the carriage and frames, respectively. The cam 51 is angularly displaced 180° with respect to and is substantially equal in weight to the cams 52 whereby the centrifugal forces due to the rotation of these cams are effectually counterbalanced. The horizontally reciprocating carriages HC are actuated by cams 53 mounted on the shaft $S_1$ between cam 51 and cams 52, respectively. Cams 53 are counterbalanced by masses of metal 55 within cams 52, the masses of metal being angularly displaced 180° with relation to the cams.

At each side of the film feeding mechanism a thin elongate trailer 56 having an opening therein to receive the pin 41 is arranged to be reciprocated in guides 57 by the pin 41 and thus maintain the slot 39 closed. In this way the oil within the casing of the film feeding mechanism is prevented from being thrown out through the slot and foreign matter is prevented from passing into the casing.

Each of the three faces of each of the cams 51 and 52 has the form of an arc of a circle whose center is the center of one of the small circles $a$, $a'$, $b$, $b'$ and $c$, $c'$ opposite the cam faces, respectively, the shaft $S_1$ passing through the openings $c$, $c'$ and being keyed to the cams. The cams rotate in the direction of the arrow (Fig. 4), and from the time that the centers of the circles $a$ and $a'$ pass the vertical plane through the axis of the shaft $S_1$ until the time that the centers of small circles $b$ and $b'$ pass the vertical plane, the vertically reciprocating parts are maintained stationary. After the centers of the circles $b$ and $b'$ pass the vertical plane, the carriage VC begins to move downwardly and the frames VF begin to move upwardly. This movement continues until the centers of circles $a$ and $a'$ again reach the vertical plane, at which time the vertically reciprocating parts become and remain stationary until the points $b$ and $b'$ reach the vertical plane, at which time the carriage VC starts upwardly and the frames VF start downwardly. During the downward movement of the carriage VC, the cams 53 maintain the horizontal reciprocating carriages HC in advanced position, with the pins 41 projecting outwardly through the slots 39, to engage the marginal perforations in the film and to move the film downwardly with the carriage VC. When the carriage VC reaches the lower position and becomes stationary, the horizontally reciprocating carriages HC are retracted by the cams 53 to withdraw the pins 41 from engagement with the film. The pins are maintained in retracted position until the carriage VC reaches its upper stationary position, at which time they are advanced to engage new perforations in the film.

It will be noted that the cams 51 and 52 actuating vertically reciprocating parts VC and VF make contact with the upper and lower cross members of these parts at varying distances from the vertical transverse plane equidistant from the front and rear guides. For example, in the position of the parts shown in Fig. 4, the cams contact with the cross members at their central points, but as the surfaces of the cams 51 and 52 between circles $c$, $c'$ and $a$ and $a'$ come into operation, the points of contact travel outwardly while each reciprocating part moves from one to the other extreme position, and as the surfaces of the cams between circles $c$, $c'$ and $b$, $b'$ come into operation the points of contact travel inwardly to the central plane. Obviously the tendency to cause the carriage VC and frames VF to rotate varies as the points of application of the actuating forces travel outwardly and inwardly, the tendency being a minimum when the parts are in the position shown in the drawings, and a maximum when the forces are applied at the points most remote from the aforesaid equidistant plane. For this reason it is desirable to extend either the front set or the rear set, or both sets of guides, beyond the limit of reciprocation of the parts VC and VF to give additional length to the bearing surfaces between the guides and the runners, thereby substantially eliminating the possibility of vibration or chattering due to the varying rotational tendency. For the same reason one or both sets of runners are preferably arranged to contact both on their inner and on their outer surfaces with the corresponding guides whereby one set of guides serves a double function by acting on both sides of the cooperating runners.

I claim:

1. Motion picture apparatus comprising a reciprocating film-feeding member, one or more counterbalancing reciprocating member or members, and means for reciprocating said members in opposite directions, whereby vibration due to the reciprocation of said film-feeding member is prevented.

2. Motion picture apparatus comprising a reciprocating film-feeding member, a reciprocating counterbalancing member, and means for producing equal and opposite reciprocation of said members.

3. Motion picture apparatus comprising a reciprocating film-feeding member, a reciprocating counterbalancing member on each side thereof, and means for reciprocating said film-feeding member and said counterbalancing members in opposite directions.

4. Motion picture apparatus comprising a reciprocating film-feeding member, a reciprocating member for counterbalancing vibration due to reciprocation of said film-feeding member, and means to reciprocate said film-feeding member and said counterbalancing member in opposite directions and to cause the same to dwell at the end of each movement of reciprocation.

5. Motion picture film-feeding mechanism comprising a rotating member, a reciprocating member actuated thereby, means to counterbalance vibration due to the centrifugal force of said rotating member, and means to counterbalance vibration due to reciprocation of said reciprocating member, said first means actuating said second means.

6. Motion picture apparatus comprising a reciprocating member, one or more counterbalancing reciprocating member or members, a rotating member for actuating said first member, and one or more counterbalancing rotating member or members for actuating said counterbalancing reciprocating member or members.

7. Motion picture apparatus comprising a film-feeding member, one or more counterbalancing member or members therefor, a member for actuating said film-feeding member, and one or more counterbalancing member or members of actuating said first counterbalancing member or members.

8. Motion picture apparatus comprising a reciprocating film-feeding member, one or more reciprocating counter-balancing member or members and counterbalanced cam members for producing opposite reciprocation of said members.

9. Motion picture apparatus comprising a reciprocating film-feeding member, one or more reciprocating counter-balancing member or members, and a plurality of rotating cams angularly displaced relative to each other for reciprocating said members.

10. Motion picture apparatus comprising a reciprocating carriage, one or more reciprocating counterbalancing member or members, a cam for reciprocating said carriage, one or more cam or cams for actuating said counterbalancing member or members, means for rotating said cams, said first cam being angularly displaced relative to said second cam or cams whereby motion in opposite directions may be imparted to said carriage and said counterbalancing member or members.

11. Motion picture apparatus comprising a vertically reciprocating carriage, a vertically reciprocating counterbalancing frame on each side of said carriage, a rotating cam for actuating said carriage, and other rotating cams angularly displaced 180° relative to said first cam for actuating said frames.

12. Motion picture apparatus comprising a vertically reciprocating film-feeding carriage, vertically reciprocating counterbalancing means, a horizontally reciprocating film engaging member mounted upon each side of said carriage, and rotating cams for actuating said reciprocating parts, the respective cams for actuating the film-feeding carriage and the counterbalancing means being angularly displaced whereby both linear and angular momentum is effectively balanced.

13. Motion picture apparatus comprising a vertically reciprocating film-feeding member, a horizontally movable film-engaging member carried thereby, one or more vertically movable counterbalancing member or members, whereby intermittent motion in opposite directions may be imparted to the vertically movable members and whereby intermittent motion may be imparted to the horizontally movable member.

14. Motion picture apparatus comprising a reciprocating film-feeding member, rotating means for actuating said film-feeding member, reciprocating members for counterbalancing the vibration due to the reciprocation of said film-feeding member, and rotating means for counterbalancing the centrifugal force due to the rotation of said first means, said counterbalancing members and means being axially displaced on opposite sides of said film-engaging member and its actuating means.

15. Motion picture apparatus comprising a reciprocating film-feeding member, rotating means for actuating said film-feeding member, reciprocating members for counterbalancing the vibration due to the reciprocation of said film-feeding member, and rotating means for actuating said counterbalancing members and for counterbalancing the centrifugal force due to the rotation of said first means, said counterbalancing members and means being axially displaced on opposite sides of said film-feeding member and actuating means therefor.

16. Motion picture apparatus comprising a reciprocating member, a second counterbalancing reciprocating member, and a rotating means for actuating each of said members, said rotating means being angularly displaced with relation to each other whereby the centrifugal force due to the rotation thereof are counterbalanced.

17. Motion picture apparatus comprising a film-feeding member, rotating means for actuating said film-feeding member, and a plurality of rotating means for counterbalancing the centrifugal force due to the rotation of said first means, said second means being axially and symmetrically displaced on opposite sides of said first means.

18. Motion picture apparatus comprising a support, a film-feeding member mounted to reciprocate therein, cooperating guide members on said support and on said film-feeding member, and means for adjusting the guide member on said support in a direction normal to the path of reciprocation of said film-feeding member.

19. Motion picture apparatus comprising a support, a film-feeding member mounted to reciprocate therein, cooperating guide members on said support and said film-feeding member, and means for adjusting the guide member on said support at a plurality of points in a direction normal to the path of reciprocation of said film-feeding mechanism.

20. Motion picture apparatus comprising a support, a film-feeding member mounted to reciprocate therein, cooperating guide members on said support and on said film-feeding member, and wedges for adjusting the guide member on said support at a plurality of points in a direction normal to the path of reciprocation of said film-feeding mechanism.

21. Motion picture apparatus comprising a support, a film-feeding member mounted to reciprocate therein, cooperating guide members on said support and on said film-feeding member, and a wedge for adjusting the guide member on said support in a direction normal to the path of reciprocation of said film-feeding mechanism.

22. Motion picture apparatus comprising a carriage arranged to reciprocate for intermittently advancing the film, guide members on said carriage extending beyond the limit of reciprocation thereof and guides cooperating with said guide members also extending beyond the limit of reciprocation of said carriage.

23. Motion picture apparatus comprising a reciprocating carriage for intermittently advancing the film, means for guiding said carriage, and actuating means arranged to transmit power to said carriage at varying distances from said guiding means, said guiding means being extended beyond the limit of reciprocation of said carriage whereby to prevent vibration due to the varying turning movement applied to said carriage by said actuating means.

Signed by me at Boston, Massachusetts, this 18th day of April, 1921.

WILLIAM BURTON WESCOTT.